Figure 4:
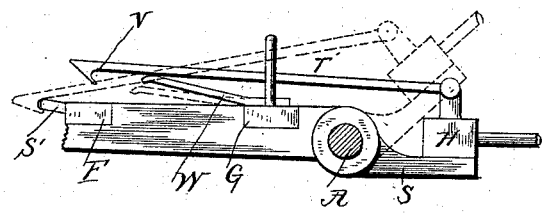

(No Model.) 2 Sheets—Sheet 1.
E. C. JENKINS.
HORSE RAKE.
No. 466,936. Patented Jan. 12, 1892.
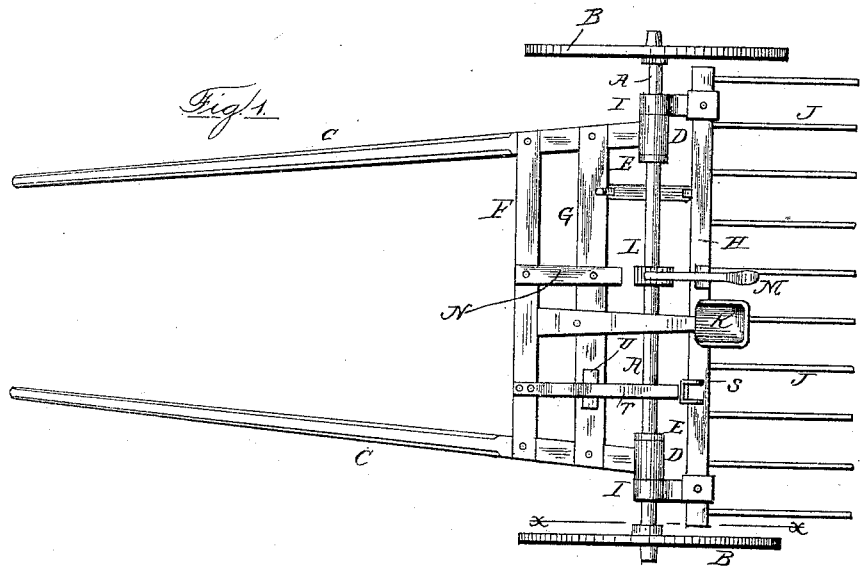
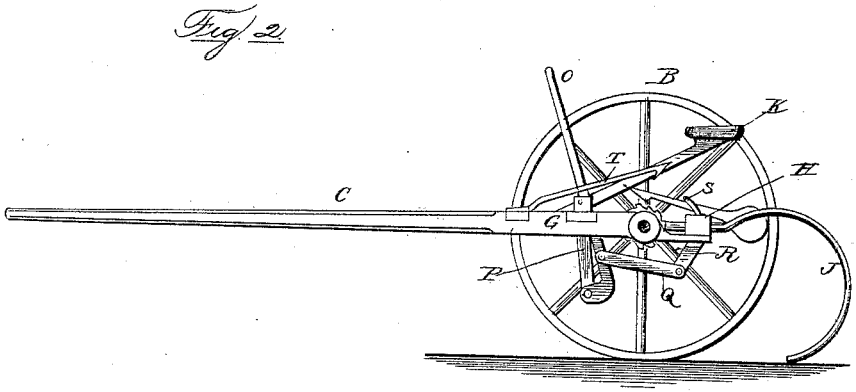
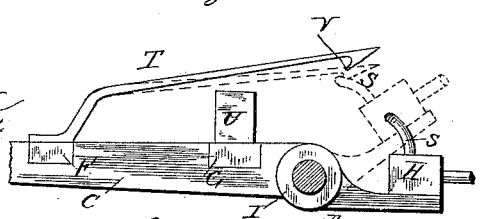
Witnesses
Walter S. Bowen
James J. Rafferty
Inventor
E. C. Jenkins
By his Attorney
Louis W. Southgate (No Model.) 2 Sheets—Sheet 2.

E. C. JENKINS.
HORSE RAKE.

No. 466,936. Patented Jan. 12, 1892.

Witnesses
Walter S. Bowen
James J. Rafferty

By his Attorney
Louis W. Southgate

Inventor,
E. C. Jenkins

UNITED STATES PATENT OFFICE.

EBENEZER CURTIS JENKINS, OF SHREWSBURY, MASSACHUSETTS.

HORSE-RAKE.

SPECIFICATION forming part of Letters Patent No. 466,936, dated January 12, 1892.

Application filed March 12, 1891. Serial No. 384,778. (No model.)

*To all whom it may concern:*

Be it known that I, EBENEZER CURTIS JENKINS, a citizen of the United States, residing at Shrewsbury, in the county of Worcester and State of Massachusetts, have invented a new and useful Improvement in Hay-Rakes, of which the following is a specification.

This invention relates to an improved attachment for hay-rakes; and the object of the same is to provide a device that will hold the rake in its elevated position, and also so arranged that it may be operated by the foot of the driver.

To this end the invention consists of the device described and claimed in this specification, and illustrated in the accompanying drawings, in which—

Figure 1 is a plan of a rake with my device applied thereto. Fig. 2 is a section on line *x* *x* of Fig. 1. Fig. 3 is an enlarged diagram showing my attachment, and Fig. 4 represents a modification.

In detail, A represents an axle, fastened on the ends of which are the wheels B B. Shafts C C, having bearings D D on the axle A, are arranged as is common and held by collars E E, fast on the axle A. The shafts C C are connected together by the cross-bars F and G. The rake-head H is suitably journaled on the axle A by means of bearings I I outside of the shaft-bearings D D. The head H has the usual rake-teeth J J, of any desired number and shape. A seat K is carried by a seat-support caught between the cross-bars F and G and extending backward, as shown. The shaft carries a ratchet L, and the rake-head has the weighted pawl M, adapted to be thrown into engagement with the ratchet L, and thus automatically raise the rake until the pawl comes into contact with the piece N, and thus automatically dump the rake.

A handle or lever O is pivoted to bracket P, held to the cross-bar G, and connects by link Q to bracket R, held on the rake-head H, so that the rake may be lifted by hand whenever it is so desired.

As thus far described the rake is of the ordinary construction—that is, the rake can be lifted and held raised by hand, or the rake can be dumped automatically; but it will be noted that the rake cannot be held from the ground without the use of one hand, and there are times, as when turning corners or when the horse starts, that both must be used on the lines, and then it is impossible to hold the rake in its raised position. The aim of my attachment is to remedy this defect. To this end a hook or staple S is fastened to the rake-head H, and a spring T is fastened on the front cross-bar F. Under the spring T on the rear cross-bar is the block U, so arranged that when the driver places his foot on the spring T the same will be depressed just the right distance. The spring T has the lip V curved in and adapted to catch the hook S.

The operation of my device will now be apparent. Ordinarily the rake-head swings under the spring T and the hook does not catch the same; but if the driver places his foot on the spring T the same will be depressed and the lip V will engage the hook S, and then the weight of the rake, acting through the hook S, will lock the parts together and hold the rake in its raised position. The rake may be thus locked by the driver placing his feet on the spring T and the pawl M at the same time while the rake is in motion, or the driver may raise the rake-frame by hand, holding the foot on the spring T.

The head may be released if the hay-rake is in motion by throwing the pawl into engagement with the ratchet, when the frame will be carried slightly forward and thus release the spring T, which will fly up out of engagement with the hook S, or the handle O may be given a pull with the same result, or the driver may catch his foot under the spring T and raise the same.

The hook or catch may be on the frame and the spring may be carried by the rake-head, as in the modification shown in Fig. 4. In this device a rod or hook T' is swiveled or fastened to the rake-head and is carried forward, as shown, by the upward movement of the rake-head. The hook S' is fastened to the front cross-bar F, as shown, and normally the bar T' will clear the same; but the bar T' may be pressed down to catch the hook, as shown in dotted lines. In this construction an auxiliary spring W is preferably used, so as to hold the bar T' in its raised position. The operation of this modification is exactly the same as before described in connection with the previous device and a detailed description of the same is not thought necessary.

It will be seen that my device is very simple and cheap and that the same can be applied to any form of dumping-rake. A careful test has demonstrated that my device will accomplish its purpose in a perfect manner.

Of course I do not wish to be limited to the exact details of construction shown, as the same may be greatly varied by a skilled mechanic without departing from the scope of my invention.

Having thus fully described my invention, what I claim, and desire to secure by Letters Patent, is—

1. In a hay-rake, the combination of the frame, the axle and wheels, the dumping-rake, the hand-lever for raising the same, the spring-catch arranged to be operated by the foot of the driver, and a hook which said catch may engage, the catch being normally set so as not to engage said hook, but so that the catch may be depressed to engage the hook and hold the rake-head up, but not at its extreme uppermost limit, whereby a pull on the hand-lever will release the catch and allow the rake-head to fall, substantially as described.

2. In a hay-rake, the combination of the frame, the dumping-rake, the ratchet-wheel and pawl for automatically lifting the rake-head, and the spring-catch and hook for holding the rake-head in its raised position, said spring-catch being set normally so as not to engage said hook, but so that when the same engages the hook the rake-head will be held up not quite at its uppermost limit, whereby the catch may be released and the rake-head allowed to fall by throwing the pawl into engagement with the ratchet-wheel, substantially as described.

In testimony whereof I have hereunto set my hand in the presence of two subscribing witnesses.

EBENEZER CURTIS JENKINS.

Witnesses:
   LOUIS W. SOUTHGATE,
   WALTER S. BOWEN.